M. BUTLER.
Horse Rake.
No. 63,011.
Patented March 19, 1867.
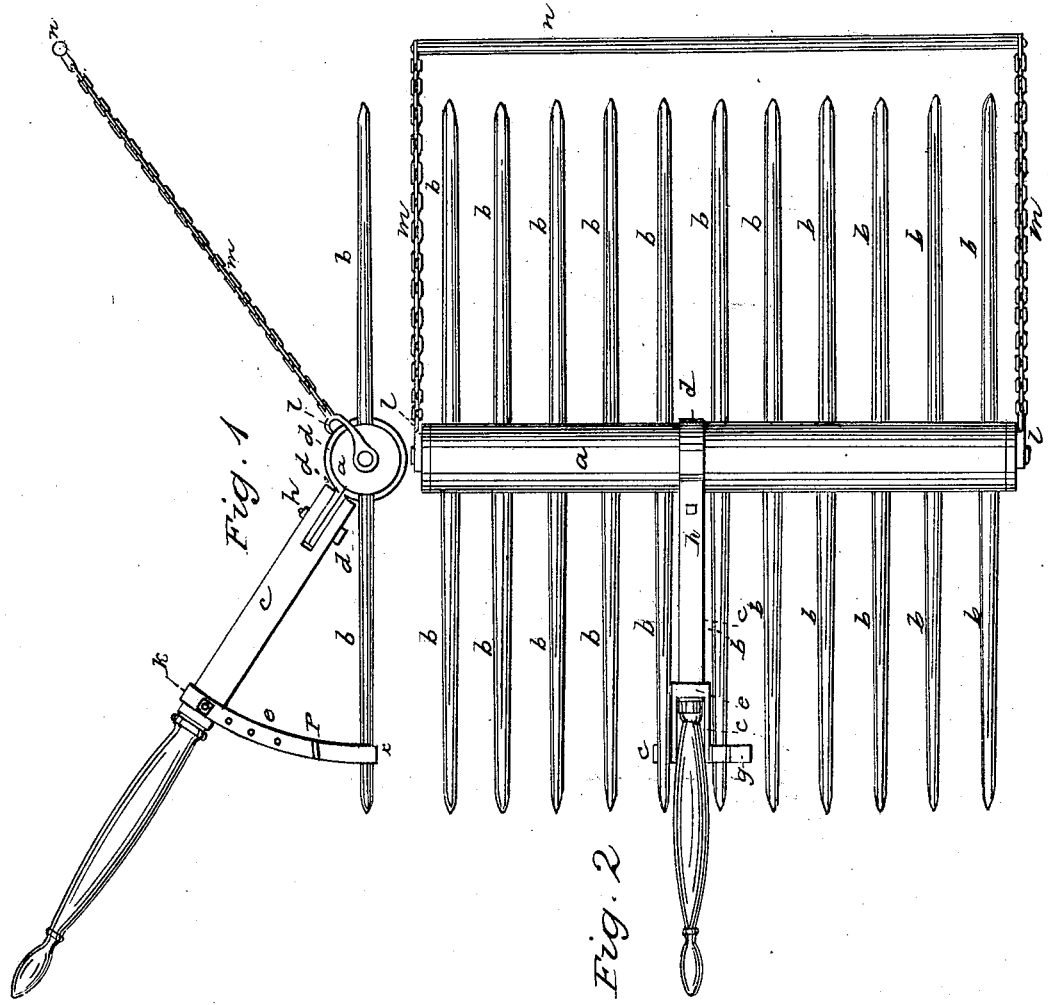

United States Patent Office.

MANLOVE BUTLER, OF VERNON, INDIANA.

Letters Patent No. 63,011, dated March 19, 1867.

IMPROVEMENT IN HORSE HAY-RAKES.

The Schedule referred to in these Letters Patent and making part of the same.

TO ALL WHOM IT MAY CONCERN:

Be it known that I, MANLOVE BUTLER, of Vernon, Jennings county, Indiana, have invented a new and useful improvement for handling and controlling "Horse Hay-Rakes;" and I do hereby declare that the following is a full, clear, and exact description of the same, reference being had to the accompanying drawings, and the letters of reference marked thereon.

Figure 1 represents a side view.

Figure 2, a top view; and

Figure 3 is a section.

The nature of my invention consists in attaching an iron A-shaped piece, marked A, with two hooks, $f$ and $f$, and one bar, $g$, to a lever, $c$, said lever being so attached to the head of the rake, $a$, as to turn to the right or left, so that when the lever is moved to the left the hook on the left side, $f$, is placed under the tooth, and by slightly elevating the lever the rake is caused to revolve, at which time the hook and bar, $f$ and $g$, on the right side of the lever, pass clear of the teeth as the rake revolves, that is, as it is turning over. The lever should be moved so as to be in a line of right angles to the head $a$ of the rake. This movement will result in placing the rake in proper position again for work, and will place the bar $g$ on the top of the first tooth on the right side of the lever, and then, by moving the lever slightly to the right, the right hook $f$ will thereby be so placed against and around the first tooth to the right of the lever as to enable the driver to keep the rake in its proper position until it is desired to have it again revolve, or to push the rake to the right or left, as may be necessary, or to lower or raise the points of the teeth as the ground or work may require.

What I claim, and desire to secure by Letters Patent of the United States, is—

1. The piece A, when constructed with the hooks $ff$ and bar $g$, and attached to the lever $c$, and arranged to operate in combination therewith, substantially in the manner and for the purpose set forth.

2. The hinge attachment $d$, which permits the lever to be laid alongside of the head of the rake, all arranged and operating as set forth and described.

MANLOVE BUTLER.

Witnesses:
HENRY R. HUEBNER,
JNO. L. SMITHMYER.